US007546380B2

(12) United States Patent
Kouvelas et al.

(10) Patent No.: US 7,546,380 B2
(45) Date of Patent: Jun. 9, 2009

(54) RPF MULTI-PARTY RELIABLE TRANSPORT

(75) Inventors: Isidor Kouvelas, Burlingame, CA (US);
Lorenzo Vicisano, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 786 days.

(21) Appl. No.: 10/428,879

(22) Filed: May 1, 2003

(65) Prior Publication Data
US 2008/0077710 A1 Mar. 27, 2008

Related U.S. Application Data

(60) Provisional application No. 60/421,724, filed on Oct. 28, 2002, provisional application No. 60/421,723, filed on Oct. 28, 2002.

(51) Int. Cl.
*G06F 15/173* (2006.01)
(52) U.S. Cl. .................. 709/242; 709/205; 709/238; 709/250; 370/392; 370/401; 707/201
(58) Field of Classification Search .......... 709/205, 709/238, 242, 250; 370/392, 401; 707/201
See application file for complete search history.

(56) References Cited

U.S. PATENT DOCUMENTS

| 5,355,371 | A | * | 10/1994 | Auerbach et al. ........... 370/255 |
| 5,910,179 | A |   | 6/1999  | Mohseni |
| 5,970,488 | A | * | 10/1999 | Crowe et al. ................... 707/8 |
| 6,078,590 | A | * | 6/2000  | Farinacci et al. ............. 370/432 |
| 6,339,791 | B1 | * | 1/2002 | Dumortier et al. .......... 709/227 |
| 6,347,090 | B1 |   | 2/2002 | Ooms et al. .................. 370/428 |
| 6,557,111 | B1 | * | 4/2003 | Theimer et al. ................ 714/4 |
| 6,597,703 | B1 |   | 7/2003 | Li et al. ....................... 370/428 |
| 6,604,117 | B2 | * | 8/2003 | Lim et al. ..................... 707/200 |
| 6,621,825 | B1 | * | 9/2003 | Walsh et al. ................. 370/412 |
| 6,751,747 | B2 | * | 6/2004 | Li ................................... 714/4 |
| 7,007,040 | B1 | * | 2/2006 | Duke et al. .................. 707/200 |
| 7,035,937 | B2 | * | 4/2006 | Haas et al. ................... 709/239 |
| 2002/0062388 | A1 | | 5/2002 | Ogier et al. |
| 2002/0150094 | A1 | * | 10/2002 | Cheng et al. ................. 370/389 |
| 2003/0126162 | A1 | * | 7/2003 | Yohe et al. ................... 707/201 |

OTHER PUBLICATIONS

Y. Dalai and R. Metcalfe; "Reverse Path Forwarding of Broadcast Packets", Communications of the ACM, vol. 31, No. 12, Dec. 1978, pp. 1040-1048.*
Information Sciences Institute, University of Southern California, "DARPA Internet Program Protocol Specification," RFC 793, Internet Engineering Task Force, Sep. 1981.

(Continued)

*Primary Examiner*—Kenny S Lin
*Assistant Examiner*—Thomas J Dailey
(74) *Attorney, Agent, or Firm*—Cindy Kaplan

(57) ABSTRACT

A multi-party reliable transport protocol for use by a higher layer application. A single session source distributes database updates to multiple receivers via a distribution tree. A node desiring to join a session selects a directly-connected node on a path upstream to a source by accessing unicast routing protocol information and sends a "Join" message to this upstream neighbor. Each node participating in the scheme handles retransmission requests from its directly-connected downstream neighbors. A supported application provides storage of previously transmitted information for potential retransmission.

27 Claims, 12 Drawing Sheets

OTHER PUBLICATIONS

S. Deering "Host Extensions for IP Multicasting," RFC 1112, Internet Engineering Task Force, Aug. 1989.

W. Fenner "Internet Group Management Protocol, Version 2," RFC 2236, Internet Engineering Task Force, Nov. 1997.

D. Estrin et al. "Protocol Independent Multicast-Sparse Mode (PIM-SM): Protocol Specification," RFC 2362, Internet Engineering Task Force, Jun. 1998.

B. Fenner et al. Protocol Independent Multicast—Sparse Mode (PIM-SM): Protocol Specification (Revised), Internet Draft, Internet Engineering Task Force, Mar. 1, 2002.

M. Handley et al. Bi-directional Protocol Independent Multicast (BIDIR-PIM), Internet Draft, Internet Engineering Task Force, Jun. 2002.

* cited by examiner

RPF MULTI-PARTY RELIABLE TRANSPORT

STATEMENT OF RELATED APPLICATIONS

The present application claims priority from U.S. Provisional App. No. 60/421,724, filed on Oct. 28, 2002, entitled, "RPF MULTI-PARTY RELIABLE TRANSPORT (RMRT).

The present application claims priority from U.S. Provisional App. No. 60/421,723, filed on Oct. 28, 2002, entitled, "INTERNAL BORDER GATEWAY PROTOCOL DOWNLOADER (IBGPD)."

The present application is related to the co-filed application entitled "INTERNAL BGP DOWNLOADER."

The contents of the above-identified applications are herein incorporated by reference for all purposes.

BACKGROUND OF THE INVENTION

The present invention is related to data networking and more particularly to protocols for distributing information among multiple parties.

Communication of packets across the internet typically involves the use of a specific transport protocol called TCP. TCP provides certain services to higher layer applications that are not inherently provided by IP itself. For example, TCP guarantees message delivery, guarantees that packets will be transferred to the receiver application in the order they are transmitted, provides flow control to prevent overflow of receiver buffers, and throttles packet transmissions when network traffic conditions would lead to packet loss.

The TCP protocol assumes a single pair of nodes, one a transmitter and one a receiver. The transmitter and receiver may be multiple hops away from one another and packets traveling as a part of the same TCP session need not always traverse the same paths. To facilitate guaranteed message delivery, the transmitter maintains a cache of previously transmitted packets to allow for necessary retranmissions.

TCP is the "work horse" of the internet, carrying traffic for mail applications, web applications, etc. However, applications with certain characteristics are not well-served by TCP. For example, consider a database update distribution application. It is desirable for a selected node to distribute database updates to a number of nodes including nodes that are not directly-connected. Guaranteed message delivery is required as is in-order delivery. It is also desirable to be able to add nodes to the session and have them receive all the information that has been transmitted since the session's beginning.

A specific example of this type of distributed database updating is the distribution of routing information updates using BGP (Border Gateway Protocol) from border routers at the edge of an autonomous system (AS) to routers within the AS. The protocol for distributing this information to the AS interior is referred to as internal BGP or IBGP. Interior nodes that speak the IBGP protocol must obtain routing updates from border routers. To address this requirement, current IBGP techniques form a full mesh of TCP connections between each border router with updates to share and each interior router. Some degree of reduction in the number of TCP connections can be obtained by using route reflectors or confederations as specified by the BGP-4 protocol document. These simplifications cause problems such as routing loops and the number of TCP connections may still be very large. The use of numerous TCP connections, however, creates other problems.

One important problem is that each border router must separately buffer each TCP connection separately for retransmission purposes. Each TCP connection buffers all data that is pending acknowledgement. TCP will maintain separate retransmission buffers even though identical data is being sent to all receivers. Each TCP connection will also require extra CPU processing and other system resource overhead. This is a highly inefficient and cumbersome use of local high-speed memory and processing resources.

There is also great waste of network bandwidth. Multiple TCP sessions will typically carry identical data on the same link on their way to different target interior nodes. Because of the bipartite nature of the TCP connections, intermediate nodes cannot simply extract desired data from the sessions they support and need their own sessions instead.

What is needed is a transport protocol suitable for distributing database updates to multiple receivers while making efficient use of memory, processing resources and network bandwidth

SUMMARY OF THE INVENTION

Embodiments of the present invention provide a multi-party reliable transport protocol for use by a higher layer application. A single session source distributes database updates to multiple receivers via a distribution tree. A node desiring to join a session selects a directly-connected node on a path upstream to a source by accessing unicast routing protocol information and sends a "Join" message to this upstream neighbor. Each node participating in the scheme handles retransmission requests from its directly-connected downstream neighbors. A supported application provides storage of previously transmitted information for potential retransmission.

A first aspect of the present invention provides a method for operating a selected node to distribute database updates within a network. The method includes: identifying one or more directly-connected neighboring nodes that participate in a transport layer session, receiving an application data unit from an application operating at the selected node, encapsulating the application data unit within a transport protocol data unit, and sending the transport protocol data unit to only the identified one or more directly-connected neighboring nodes as a part of the transport layer session.

A second aspect of the present invention provides a method for operating a selected node to support a transport layer session. The method includes: identifying a directly-connected node on a path toward a transport layer session source, the directly-connected node being an upstream node on the path, receiving a transport protocol data unit from the upstream node, extracting an application data unit from the transport protocol data unit, and delivering the application data unit to an application operating at the selected node.

A third aspect of the present invention provides a method for operating a selected node to support a transport layer session having at least three parties. The method includes: identifying a first directly-connected node on a path toward a transport layer session source, receiving a transport protocol data unit from the first directly-connected node, forwarding contents of the transport protocol data unit to a second directly-connected node that is downstream from the transport layer session source and the selected node, storing contents of the transport protocol data unit in a local cache, receiving a request for retransmission from the second directly-connected node, and retransmitting in response to the request by retrieving from the local cache.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative environment, a mesh network of nodes (e.g., routers) employing well-known protocols such as IP, TCP, UDP, etc. In one embodiment, the present invention provides a transport protocol that provides reliable database distribution services to nodes of this network. This transport protocol will be referred to as Reverse path forwarding Multi-party Reliable Transport (RMRT). Each RMRT session is established between a single server application on a source router and a set of client applications each on a receiving router. The server and client applications may be the internal BGP downloader referred to in the co-filed application.

RMRT Overview

Figure 1:
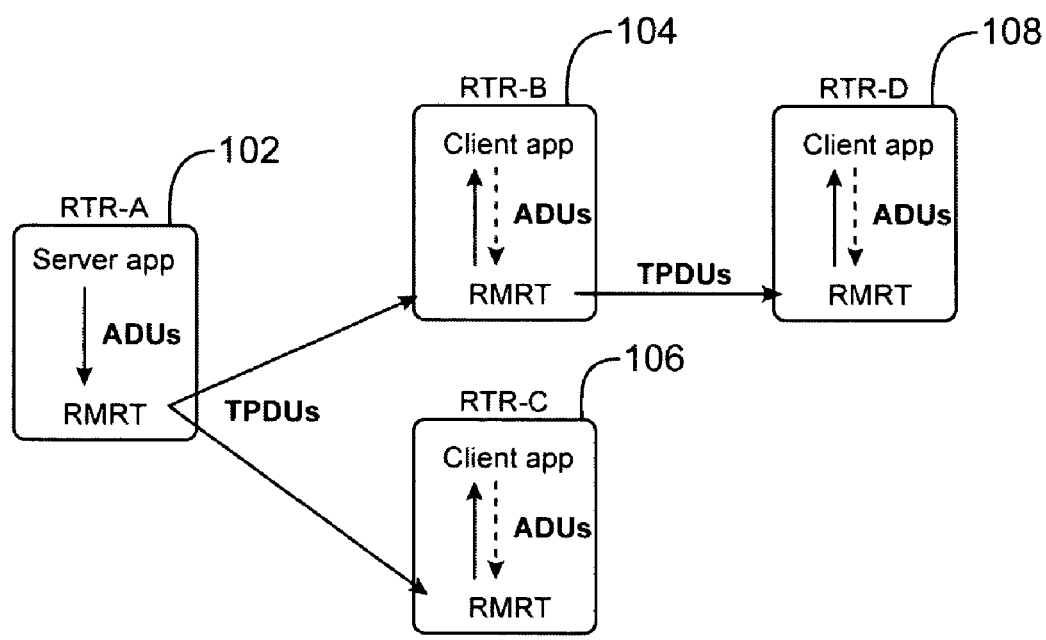
FIG. 1 depicts hop-by-hop propagation and delivery to applications of database contents according to one embodiment of the present invention.

FIG. 1 depicts hop-by-hop propagation and application delivery in RMRT according to one embodiment of the present invention. In FIG. 1, a router 102 is the session source and database updates are distributed to clients operating at receiver routers 104, 106, and 108. In RMRT, the server application on source router 102 provides data to be transported in a series of application data units (ADUs). Each ADU generated by the server application is associated with a sequence number. RMRT builds transport protocol data units (TPDUs) which are packets containing one or more ADUs. The TPDUs are propagated hop-by-hop through the network by routers participating in the RMRT sessions.

In RMRT, in the embodiment now being described, all routers that are used to propagate TPDUs through the network also participate as receivers in the RMRT session. Also, when a participating router receives new TPDUs it delivers the contained ADUs in sequence order to a local client receiving application.

As shown in the simple example of FIG. 1 an RMRT session transfers information via a distribution tree. Each RMRT participant (other than the source) has one upstream neighbor on the tree and may also have one or more downstream neighbors. Each RMRT participant may be an upstream endpoint for multiple associations. However, each RMRT receiver has only one upstream router. In accordance with embodiments of the present invention, UDP (or some other unreliable datagram protocol) is used to propagate the TPDUs between routers. An unreliable datagram protocol (as opposed to a reliable one such as TCP) is preferred because RMRT includes its own retransmission mechanism as will be explained. Each RMRT session participant may share retransmission buffering capacity among multiple downstream receivers, a great improvement over the use of multiple TCP connections.

During steady state operation, each non-source participant performs three basic tasks:

1. Receive RMRT TPDU packets transmitted by the upstream neighbor router.
2. Extract ADUs from the TPDUs.
3. Deliver the ADUs to the local application.
3. Construct and propagate TPDUs to downstream neighbors on the tree.

Distribution tree connectivity is based on reverse path forwarding (RPF), a technique typically used for multicast routing. A router wishing to join an RMRT session and connect itself to the session's distribution tree relies on unicast routing protocol information to establish connectivity to the source. It is assumed that participating routers operate a unicast routing protocol such as IS-IS, OSPF, or EIGRP as are known in the art. The participating router is assumed to be aware, through preconfiguration for example, of the IP address of the session source. The RMRT receiver uses the unicast routing protocol information to find a path to the source and the next-hop router on this path. Forwarding of TPDUs will occur on this path, only in the reverse direction from the one envisioned by the unicast routing protocol. Thus the router which is the unicast next-hop toward the source is the previous-hop on the RMRT distribution tree.

Having determined the previous-hop towards the source, an RMRT receiver receives all TPDUs and requests all retransmissions from that router. The RMRT receiver's determination of the previous-hop is dynamic and tracks changes in the connectivity information provided by the unicast routing protocol. Switching between different previous-hops in the same RMRT session is transparent to ADU reception because all RMRT routers participating in a session maintain the ADU to sequence number mapping that was originally assigned on the source router.

The TPDUs are transmitted using UDP/IP best-effort datagram service. When a receiving router misses one or more TPDUs all necessary retransmissions are provided by the immediate previous-hop rather than by the source.

In one embodiment, RMRT uses a NAK-based mechanism to request retransmissions. RMRT does not have to buffer ADU data in order to be able to retransmit it. Rather, it can rely on the resident application being able to reproduce ADUs on demand when presented with their sequence number. Based on application-specific parameters, the application itself can decide on the amount of ADU sequence history it is willing to maintain in order to serve retransmissions. If the amount of history is not sufficient to rebuild the required retransmission packets then RMRT has the option of falling back to a full database synchronization between directly-connected neighbors. Also, to improve efficiency, RMRT may maintain its own cache of previously transmitted ADUs.

Software Architecture

Figure 2:
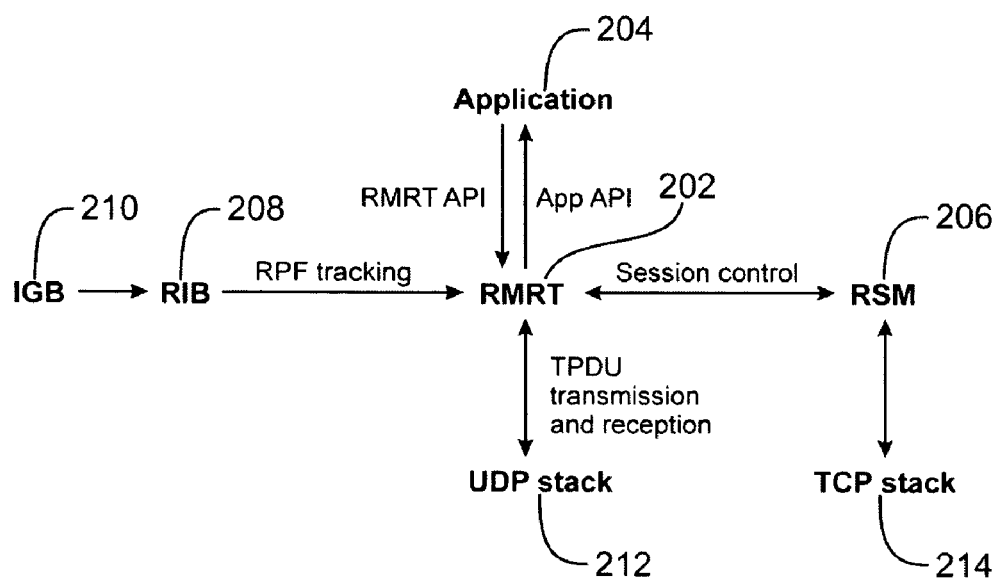
FIG. 2 depicts interaction between a transport layer module and other router software components according to one embodiment of the present invention.

FIG. 2 depicts interaction between an RMRT module 202 and other router software components according to one embodiment of the present invention. FIG. 2 shows RMRT module 202, an application 204, an RMRT session manager (RSM) 206, a routing information base (RIB) 208, and a unicast routing protocol component 210 that operates an IGP such as, e.g., OSPF, IS-IS, etc. There are also interactions with the UDP stack 212 and TCP stack 214 of the router.

An application program interface (API), as will be described below, is used for interactions between RMRT module 202 and application 204. The API is used to exchange ADUs and for the RMRT to request previously transmitted ADUs for the purposes of retransmission and synchronization. RMRT learns of the path to the source through RIB 208 which is in turn populated by the unicast protocol component 210. RSM 206 provides control channel services to communicate session control information with directly-connected neighboring routers including Join and Prune messages. The TPDUs themselves are transmitted and received via the UDP stack 212. RSM 206 uses TCP stack 214 to maintain the control channels.

Figure 3:
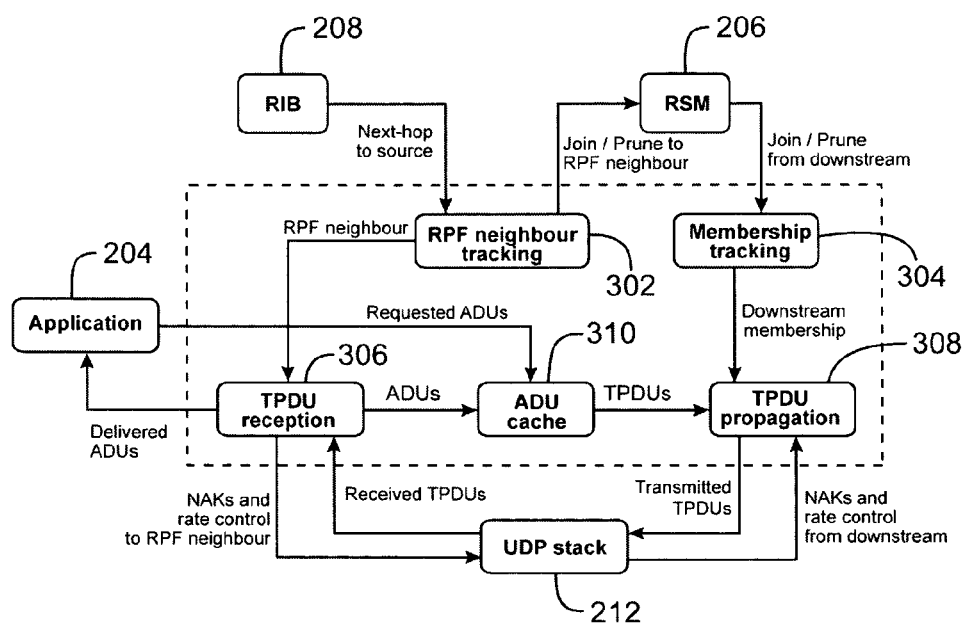
FIG. 3 depicts internal structure of a transport layer module according to one embodiment of the present invention.

FIG. 3 depicts the internal structure of RMRT module 202. RPF neighbor tracking component 302 interacts with RIB 208 to determine the directly-connected node on the path upstream towards the RMRT session source. The RIB has of course been previously populated by the unicast routing protocol operating on the receiver router. Membership tracking component 304 processes Join and Prune messages from downstream directly-connected nodes via the RSM control channel. This received information is used to maintain the downstream membership database, i.e., the nodes to which received TPDUs will be forwarded.

A TPDU reception component 306 processes incoming data and delivers it to the application while also dealing with detection of lost TPDUs and responding by making any necessary retransmission requests. A TPDU propagation component 308 propagates received TPDUs to the subscribing downstream directly-connected neighbors obtained by membership tracking component 304. The transmitted TPDUs are reconstructed from the received ADU information, although some implementations may typically simply copy the contents of received TPDUs and rewrite the IP source and destination addresses. TPDU propagation component 308 also responds to retransmission requests from the downstream neighbors. An ADU cache 310 stores recently received ADUs that will be needed by the TPDU propagation component. ADU cache 310 may not be strictly necessary since ADUs are available from application 204 but it may be more optimal to cache a certain number of recently transmitted ADUs.

Having identified this RPF upstream neighbor, RMRT module 202 proceeds to notify the neighbor that session data is required. RPF neighbor tracking component 302 invokes RSM 206 to send a Join control message upstream to the upstream neighbor. This is transmitted using the RSM control channel. Membership tracking component 304 receives Join and Prune messages from downstream routers and maintains the list of neighbors to which TPDUs will be propagated.

RPF neighbor tracking component 302 continually monitors RIB 208 to always know which node is the unicast next-hop neighbor (previous-hop on the RMRT distribution tree) toward the source. Network topology changes discovered by the unicast routing protocol may result in a change of next-hop toward the session source. When there is such a change, RPF neighbor tracking component 302 invokes RSM 206 to send a Prune message to the old unicast next-hop neighbor to indicate that session forwarding from the former next-hop is no longer required. Also, RPF neighbor tracking component 302 invokes RSM 206 to send a Join message to the new unicast next-hop node.

It will be appreciated that for a session source, ADUs are only obtained from the application and not delivered to the application. Also, the session source does not select an upstream neighbor but does track downstream membership like any other session participant.

Sequence Numbers

For all the ADUs propagated from the session source to the participating receivers, a consistent sequence number space is used. At the session source, each ADU generated by the server application is assigned a new sequence number by, e.g., either the application or by RMRT. The mapping between the sequence number and the ADU is included in the constructed TPDU packets and communicated through the session receivers. When a receiving router delivers the ADU to the resident client application, the associated sequence number is also communicated. Receiving applications maintain this mapping to assist RMRT in its operation. After having delivered an ADU to the client application, the RMRT module may request the ADU back for retransmission purposes by specifying its sequence number.

ADU sequence numbers are assigned from a finite space that may be exhausted during the lifetime of an RMRT session. RMRT deals with the possibility of exhaustion by allowing the sequence space to wrap.

To avoid ambiguity among multiple ADUs sharing the same sequence number following wrapping, ADUs are disassociated from the sequence members long before the sequence numbers are reused. This disassociation occurs at the very latest when a new ADU is assigned a sequence number halfway across the sequence space from an old ADU.

Figure 4:
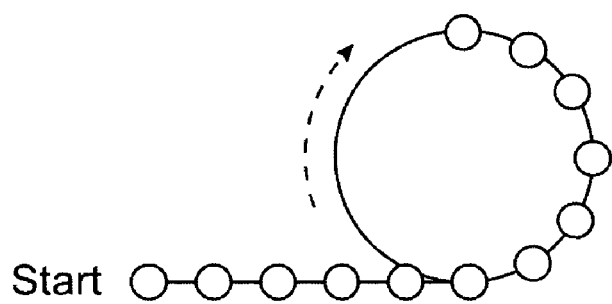
FIG. 4 depicts the use of application data sequence numbers according to one embodiment of the present invention.

FIG. 4 depicts the sequence number disassociation process according to one embodiment of the present invention. The black dots represent ADUs. The rotating circle represents the sequence number space. ADUs on the flat line (outside the circle) represent old ADUs for which the sequence number association is no longer maintained. The sequence number of the ADU at the bottom of the circle is retired as soon as the sequence number at the top of the circle is assigned. In this way, it is assured that a single sequence number represents only a single ADU at any one time. This disassociation process occurs across all the routers participating in the RMRT session.

The consistent sequence numbering of ADUs across all routers participating in a session allows the RMRT component to avoid unnecessary ADU buffering. Once an ADU has been delivered to the local application RMRT can retrieve it through the API provided by the application using the ADU sequence number as a key. As a result, to support TPDU propagation and retransmission, all ADUs could be obtained from the applications database.

Reliable In-Order Delivery

Figure 5:
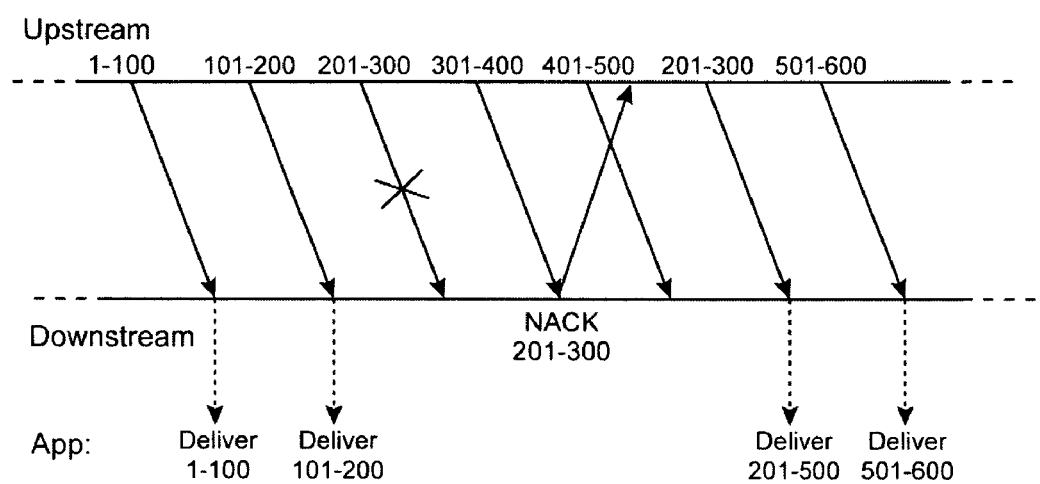
FIG. 5 depicts selective loss retransmission and in-order application data unit delivery according to one embodiment of the present invention.

Since unlike TCP, UDP does not include a reliability mechanism, RMRT provides for a reliability mechanism to be built on top of UDP. FIG. 5 depicts retransmission according to one embodiment of the present invention. TPDU reception component 306 tracks the received ADU sequence numbers. Any missing sequence numbers are noted as losses and result in a retransmission request to the upstream neighbor. The TPDU reception component 306 requests retransmission by sending a negative acknowledgement (NAK) encapsulated within a UDP datagram.

A missing ADU is detected when the next TPDU packet is correctly received and the gap in the received ADU sequence members is noticed. This is achieved by comparing the starting ADU sequence number in the latest TPDU to the last correctly received ADU sequence number.

Each NAK packet includes a list of ranges of ADU sequence numbers that are missing. Upon receipt of a NAK, the upstream neighbor suspends current ADU propagation and instead prioritizes retransmission of the missing ADUs. New TPDUs may be constructed for retransmission purposes. The ADUs may come from ADU cache 310 or they may be requested from the application. When all of the missing ADUs have been retransmitted, transmission of current ADUs is resumed from the point where it left off.

To improve the speed of loss detection during silent periods, dummy TPDUs are transmitted. Dummy TPDUs contain no real ADU data and just convey the last transmitted ADU sequence number to allow receivers to realize that they have missed one or more previous ADUs.

Figure 6:
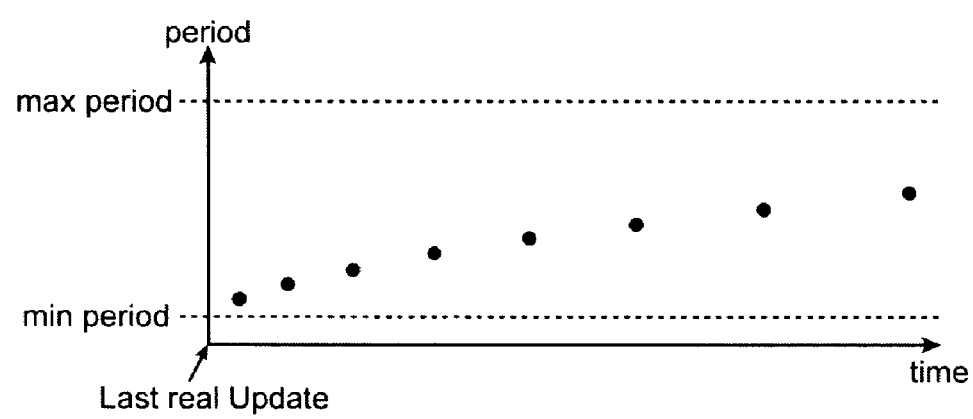
FIG. 6 depicts spacing of dummy application data units according to one embodiment of the present invention.

FIG. 6 depicts the transmission spacing of dummy ADUs after the beginning of the silent period according to one embodiment of the present invention. The transmission rate decreases exponentially with time as the silent period continues. No dummy TPDU messages are sent while normal TPDUs are being regularly transmitted. The transmission rate for dummy TPDUs is controlled separately at each transmitting router.

Some embodiments may also incorporate a low frequency periodic positive acknowledgement mechanism. Receipt of a NAK from a downstream router can be used to deduce the earliest sequence number in the session before which the downstream has currently received all ADUs. However, while all ADUs are being received correctly, no NAKs are issued. Use of a positive acknowledgement may allow a session participant to safely discard known correctly received ADUs from its cache.

Also, when a positive acknowledgement is received indicating the last transmitted ADU before a silent period was correctly received, there is no reason to conduct dummy TPDU transmissions. Thus, positive acknowledgements (ACKs) may be sent at a configurable frequency by each session member to its upstream neighbor. Each ACK contains the ADU sequence number of the first ADU up to which all session ADUs have been correctly received. Transmission of periodic ACKs takes place only while there is TPDU activity from the upstream neighbor and while no NAKs are being issued.

Database Synchronization

It is possible for a receiver RMRT session to be missing an ADU whose retransmission cannot be requested by specifying its sequence number. The ADU can either have been dissociated from its sequence number or deleted from the upstream router database. This can happen in, for example, two cases:

1. When a new receiver joins a session and the session has been active for long enough that ADUs with no associated sequence number may already exist.

2. If the network becomes partitioned during the session, receivers that are disconnected from the source will have no way of receiving ADUs. If this partition persists long enough for half the sequence base to be exhausted, the missing ADUs will become disassociated from their sequence number.

Embodiments of the present invention provide for an RMRT database synchronization process to bring receivers in these two cases up-to-date with the session. The synchronization process is invoked by an upstream router when it receives a retransmission request from the downstream router that it cannot service due to disassociation of the requested ADUs from their sequence numbers. During synchronization, a complete transfer of the application database occurs without interfering with regular ADU propagation.

The synchronization process relies on cooperation between the RMRT component and the local application. Synchronization is achieved by transferring the complete contents of the session ADU database. This database includes all ADUs that are no longer associated with a sequence number but are still needed to reconstruct the current global state of the application database. These ADUs are still stored by the application in order albeit without their sequence numbers. The database also includes the ADUs that still have a sequence number association and are thus stored with their associated sequence number either by the RMRT component or by the application. After synchronization, the recovering router will have all the ADUs that were originated by the session source over the session lifetime. The ADUs are communicated and delivered to the local application and the recovering router in the order in which they were originally generated. In addition to the ADU data, the existing ADU sequence number associations are transferred so that the recovering router can become a full session participant.

During synchronization, the application is configured to transmit the database contents under its control at the direction of the RMRT module. To facilitate this control, the application programming interface (API) between the RMRT module and the application includes two special up-calls. One up-call initiates a walk through the database. The walk is identified with a handle so as to differentiate among walks that may be taking place in parallel due to simultaneous synchronization sessions to different downstream clients. Once a walk is established, another up-call is invoked to obtain the next ADU from the application's database. Each time this call is invoked, the application provides the next ADU in the order in which they were originally generated by the session source. For ADUs that still have a sequence number association in the application database, the sequence number is also provided to RMRT.

There may also be up-calls provided to facilitate rewinding and fast forwarding within the same walk. The support for rewind and fast forwarding allows the RMRT component to avoid buffering ADU data obtained during a walk until it is certain that the data has been correctly received and delivered to the application on the downstream router receiving the synchronization.

At the router receiving the synchronization, processing of ADUs is quite similar to processing during normal session participation. Essentially the only difference is that during the early part of the synchronization session, ADUs delivered to the application will not be associated with a sequence number. Sequence numbers will become available when the synchronization process enters the part of the upstream router's database that still has sequence numbers associated with the ADUs. A variety of techniques can be used to actually transfer database contents during the synchronization process. For example if the rewinding forwarding up-calls described above are available, then a private RMRT session between the two routers may be used to transfer the data. This minimizes the need for transport buffering overhead on the upstream router supporting the synchronization. If there is no rewind capability, a TCP connection may be used.

Flow and Congestion Control

It is desirable to employ flow and congestion control in conjunction with the use of RMRT. In one embodiment, RMRT employs Datagram Congestion Control Protocol (DCCP) as described in Kohler, et al., "Datagram Congestion Control Protocol", IETF Internet Draft, March 2003, the contents of which are herein incorporated by reference for all purposes in their entirety. DCCP is a lightweight protocol that provides congestion control and flow control to applications that do not require reliability or provide their own reliability mechanism. RMRT may employ DCCP instead of UDP. DCCP establishes a bi-directional flow of information. The reverse path (from the downstream to the upstream) can be used by the RMRT component to convey the negative acknowledgements. Also, advantageously, DCCP has minimal header and protocol state overhead.

ADU cache 310 may be exploited to accommodate multiple transmissions of the same ADUs when required by either flow control or congestion control. The use of ADU cache 310 for these purposes and for retransmission is reasonably efficient since the cache is shared among all downstream receivers. The cache size is configurable depending on the impact of requests to the application.

Application Programming Interface

RMRT provides the following call to the application:

RMRT_ADU_notify(new_ADU_count) Used by the server application on the source router to notify the RMRT component of newly available ADUs. RMRT may return the sequence number that is to be assigned to the first ADU or the application itself may provide it.

The application provides the following up-calls to RMRT:

app_ADU_request (sequence_no)

Used by RMRT to request a specific ADU from the application. The application returns the ADU or an error if the requested ADU sequence number is not in the history maintained by the application app_ADU_receive (ADU, sequence_no)

Used by RMRT on routers that are receivers of a session to deliver a correctly received ADU to the client application.

app_sync_parent_init ( )

Used by RMRT to notify the application that it is initiating a new synchronization process with a downstream neighbor. The application returns a handle that RMRT should use on all subsequent calls related to this synchronization process.

app_sync_parent_done (sync_handle)

Used by RMRT to notify the application that the synchronization process has completed and that it may discard any associated state.

app_sync_parent_ADU_next (sync_handle)

Used by RMRT during the database synchronization process to obtain the next ADU in the application database. The application returns the ADU as well as its sequence number if it is associated with one. If the synchronization process reaches the end of the database then no ADU is returned.

app_sync_parent_ADU_rewind (sync_handle, ADU_count)

Used by RMRT during the database synchronization process to instruct the application that a rewind in the walk by a number of ADUs is required.

app_sync_parent_ADU_fwd (sync_handle, ADU_count)

Used by RMRT during the database synchronization process to instruct the application that a forward jump in the walk by a number of ADUs is required.

app_sync_child_reset ( )

Used by RMRT to inform the application that it is about to receive a database synchronization.

app_sync_child_done(history_base)

Used by RMRT to inform the application that the synchronization process is complete and to provide the ADU sequence number after which no disassociation has taken place.

RMRT Session Manager (RSM)

RMRT session manager (RSM) 206 is responsible for coordinating a set of RMRT sessions (one or more) belonging to the same application. From the perspective of a particular router in a network using RMRT the resident application may be the originator of multiple sessions a swell as a member of multiple remotely originated sessions. The capability of applications on different routers to originate sessions provides support for multi-way communication through RMRT. The ability for an application in a single router to originate multiple RMRT sessions provides support for communication of different classes of information. Coordinating sessions belonging to the same application has two advantages:

1. Coordination enables more efficient use of router and network resources. More specifically:

a. A RMRT speaker needs to exchange session control information with its directly connected neighbors. An RSM reliable control connection based on TCP is used in this exchange. Control messages, belonging to different RMRT sessions for the same application share the RSM connection between each pair of directly connected participating routers.

b. An application may use a large number of RMRT sessions to classify information with different receiver membership. When a receiving router is joining two or more sessions through the same RPF neighbor, the UDP packets used to carry TPDUs can be used to multiplex TPDUs belonging to different sessions.

c. Similar to TPDU multiplexing, adjacent routers can bundle NAKs belonging to different sessions in the same UDP packet. In fact TPDUs and NAK for sessions heading in opposite directions between a pair of neighbors can be combined in the same packet.

d. When a router restarts or recovers from a network outage it may have to synchronize the contents of its application database. In an application with many RMRT sessions it is likely that more than one of the synchronization sessions will be obtained through the same RPF neighbor. Just like sharing is achieved with the RSM control connection, a single synchronization TCP connection can be established between the two routers for the transfer of data belonging to multiple synchronization sessions.

2. Coordination of multiple sessions enables dynamic network configuration:

a. RSM provides a hello protocol that enables directly connected neighbor auto-discovery. The application has the option of manually specifying a list of valid neighbors or having them discovered through RSM.

b. RSM can be used by a router originating a session to advertise the existence of the session to potential receivers. Knowledge of the session is flooded to all potential receivers that can then decide whether to join it or not. A router originating a session can distribute an application specific session description with the session announcement. The session description can be used by potential receivers to determine their interest in receiving the session.

Each application using RSM and RMRT should select a well-known RSM TCP control port as well as a well known TPDU UDP destination port. The TCP and UDP ports are used to de-multiplex between different applications using RMRT and allow neighboring routers running the same application to talk between them.

An application using multiple RMRT sessions should have a way of addressing them. RSM and RMRT use a common session identification mechanism consisting of two pieces of information:

1. The IP address of the router originating the session.
2. A session ID assigned by the resident application on the router originating the session. This ID is used to distinguish the session from other sessions originated by the application on the same router.

Transit Routers

RMRT is designed to reliably distribute a database in a network of routers where every router is participating as a session receiver. However, according to embodiments of the present invention, RMRT may be extended to allow for routers that do not wish to receive session data to nonetheless support RMRT implementation in the network by acting as transit routers.

A RMRT transit router has a software component structure similar to what has been illustrated and described above but there are a number of differences compared to a RMRT session participant:

- As the transit router is not a regular session member, it only participates in a session when a full downstream participant joins through it. When there are no downstream members that require session data forwarding the transit router does not join.
- In an RMRT transit router, the resident application is not interested in ADU data. As a result received ADUs are not delivered to the application and can therefore not be re-obtained through it.
- A RMRT transit router relies on its local cache for storing ADUs that need to be propagated downstream. Any required ADUs that are not present in the cache must be requested from the upstream router.
- A RMRT transit router does not perform the services of a synchronization parent as it does not store the complete session database. It therefore redirects downstream routers requiring a synchronization to obtain it from a full participant further upstream.

Figure 7:
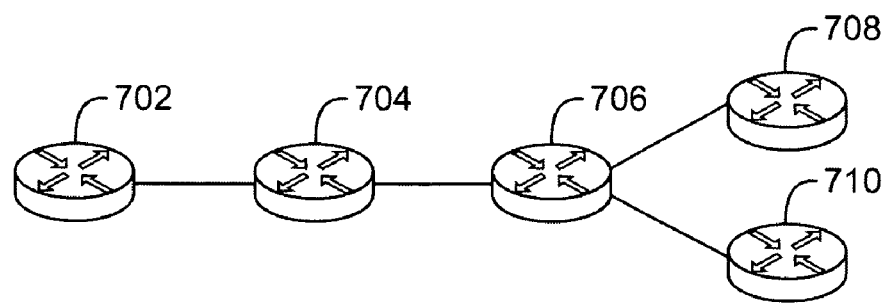
FIG. 7 depicts use of a transit router in a multi-party transport protocol according to one embodiment of the present invention.

FIG. 7 depicts a simple RMRT scenario involving use of a transit router. There is a session source 702, a receiver 704, a transit router 706, and two additional receivers 708 and 710.

The following sequence of events takes place:

1. A receiver 704 is adjacent to source 702 and joins it directly whereas receivers 708 and 710 send Joins for the session to RMRT transit router 706.
2. Transit router 706 realizes it should forward the session and sends the Joins towards the source through receiver 704.
3. Receiver 704 accepts the Join from the transit router 706 just like it would accept that of a regular member and starts forwarding TPDUs.
4. Transit router 706 propagates the TPDUs possibly storing the contained ADUs in its local cache.
5. Upon receipt of the first TPDU, the receivers 708 and 710 notice that they are missing earlier session ADUs that were originated before they joined the session. They therefore send a NAK to transit router 706 indicating the ADUs it needs to retransmit.
6. Transit router 706 does not have the requested ADUs stored locally as the resident application is not receiving data. It therefore records the range of ADUs that are missing from each downstream receiver and sends a NAK to receiver 704 requesting them.
7. Receiver 704 reproduces the ADUs from its local application database and sends them in TPDUs to transit router 706.
8. Transit router 706 propagates the ADUs to receivers 708 and 710.

Receivers 708 and 710 have now caught up and continue to participate normally in the session. TPDU losses are handled as follows:

1. Receiver 708 experiences a TPDU loss. When the next TPDU arrives it realizes that there are missing ADUs and it issues a NAK to transit router 706.
2. Transit router 706 receives the NAK and since it recently propagated the ADUs they are also stored in the local RMRT cache. The transit router uses the cached ADUs to create a TPDU which it sends to receiver 708.

The example above has shown how a transit router appears just like a regular participant to both its upstream neighbor as well as to the downstream members. In fact any number of RMRT transit routers and regular participants can be mixed in any order between a RMRT session source and a receiver. There is also no special treatment required with RPF neighbor changes. This is true both when the transit router itself changes the neighbor from which it is receiving the session as well as when a downstream participant of a transit router switches to join through a transit router or away from it.

Controlling the amount of data to be stored in the RMRT cache of the transit router is a tradeoff between memory resources on the transit router itself and network and processing resources between the transit router and its upstream neighbor. The cost of having a downstream member request an ADU that is not present in the transit router cache is that the transit router has to communicate with its upstream neighbor to obtain the ADU.

Reception at a transit router of NAKs and periodic ACKs (positive acknowledgements) described above can help in reducing the local ADU cache size. When a transit router confirms through NAKs and periodic ACKs that all of its downstream members have received all ADUs up to a specific ADU it advertise this ADU sequence number in its own periodic upstream ACK.

In the just-described example, the transit router had multiple downstream session participants connecting to the session through it. Having the transit router receive TPDU packets and replicate them for the downstream members as well as process NAKs from downstream improves the scalability of propagation. However, if in an RMRT session, a transit router has a single downstream member joining through it, then involving the transit router in the communication just introduces overhead.

When only a single downstream member joins the session through a transit router, then the transit router can instruct its upstream neighbor to send TPDUs to the downstream joiner without any transport layer involvement by the transit router. This situation is illustrated in FIG. 8.

Figure 8:
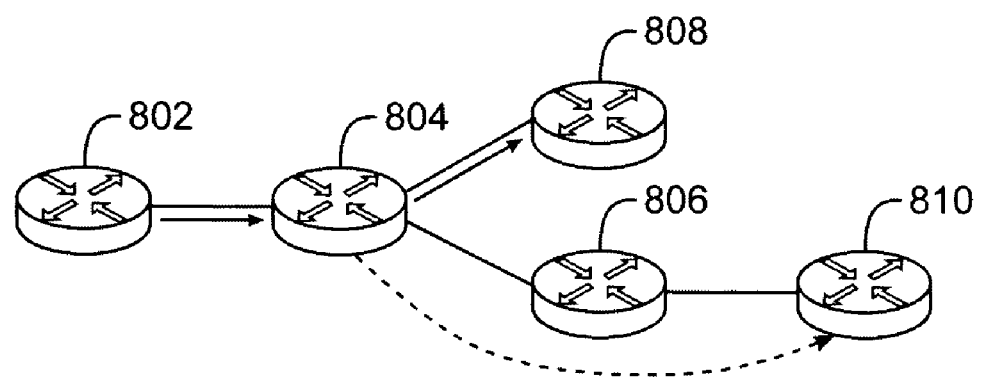
FIG. 8 depicts tunneling through a transit router according to one embodiment of the present invention.

In FIG. 8, there is a source 802, two transit routers 804 and 806 and two receivers 808 and 810. Transit router 806 has only router 810 joining through it. In contrast transit router 804 has both receiver 808 and transit router 806 joining through it. It is therefore beneficial to have transit router 804 receive and forward session data. In the case of transit router 806 it is beneficial to simply tunnel through it. The tunnelling is initiated during the join process and is adaptive to membership and network changes.

Consider the following scenario which begins before either of the receivers join the session in the example network of FIG. 8:

1. Receiver 808 joins the session through transit router 804. At this point in time receiver 810 has not yet joined the session.
2. Transit router 804 determines that since receiver 808 is the only member joining through it, TPDUs should be tunnelled through it. It contacts its RPF upstream neighbor (source 802) to join the session. While joining it specifies that TPDUs are to be sent directly (i.e., with no transport layer involvement by transit router 804) to receiver 808.
3. Source 802 acknowledges the Join and informs transit router 804 that TPDUs are going to be originated by itself (i.e., not originated further upstream and simply tunnelled through transit router 804's upstream neighbor).
4. Transit router 804 acknowledges the Join of receiver 808 and informs it that TPDUs will be sent by the source and not by transit router 804.

Receiver 808 is now participating in the session and receives TPDUs directly from source 802. NAKs from receiver 808 are also sent directly to source 802. The involvement of transit router 804 in this communication is simply to forward the TPDUs and NAKs as any other ordinary data packet.

Now, receiver 810 switches on and decides to join the session. The steps are as follows:
1. Receiver 810 sends a Join to transit router 806.
2. Transit router 806 determines that receiver 810 is the only member joining through it and decides to tunnel TPDUs and NAKs. It joins the session through transit router 804, instructing it to send TPDUs directly to receiver 810.
3. Transit router 804 receives the Join of transit router 806 and now determines that there are two downstream joiners through it (receiver 808 and transit router 806). It therefore decides to start performing the functions of the RMRT transit router for the session.
   a. Transit router 804 instructs source 802 that TPDUs are to be no longer sent to receiver 808 but instead sent to transit router 804 itself.
   b. Transit router 804 instructs source 802 that it will no longer receive TPDUs directly from source 802 but instead from transit router 804 itself
   c. Transit router 804 responds to the join of transit router 806 specifying that TPDUs will be sent by transit router 804.
4. Transit router 806 receives the join acknowledgement and notifies receiver 810 that it will be receiving TPDUs from transit router 804.

At this point session forwarding has reached the state shown in FIG. 8. Transit router 804 is participating in the session as a transit router as it has more than one downstream participant. The session is being tunnelled between transit router 804 and receiver 810 through transit router 806 since transit router 806 only has a single downstream member.

Alternatively, the threshold number of downstream members for a transit router deciding when to tunnel data through it and when to participate in a session can be set to be higher than one. A transit router can instruct its upstream neighbor to tunnel to multiple downstream members.

A router downstream of a transit router may request from the transit router the retransmission of ADUs that are no longer associated with sequence numbers in the application database of upstream routers with full session participation. When the transit router attempts to recover these ADUs from upstream, it will be notified that a RMRT synchronization process is required. However, the RMRT transit router that is functioning as the upstream neighbor of the router missing the ADUs cannot be a synchronization parent and provide the full session database. The transit router therefore redirects the downstream router to obtain the synchronization from the first fully participating router on the path towards the session source.

Figure 9:
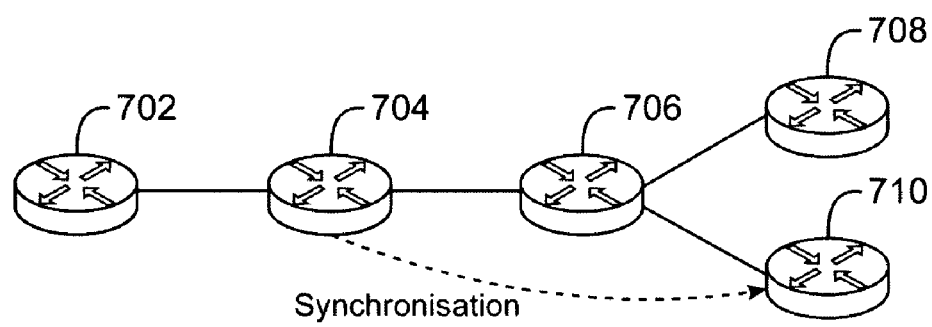
FIG. 9 depicts synchronization redirection according to one embodiment of the present invention.

FIG. 9 depicts how synchronization redirection operates in the transit router scenario of FIG. 7. The steps taken to initiate the synchronization process are as follows:
1. Receiver 710 restarts with an empty application database. It sends a NAK to transit router 706 requesting all the ADUs in the session so far.
2. Transit router 706 only has recent ADUs in its cache. It therefore propagates the NAK upstream to receiver 704 indicating that all the ADUs are required.
3. Receiver 704 receives the NAK but since the session has existed for a long period, there are ADUs in its database that no longer have a sequence number association. It therefore instructs transit router 706 through the RSM control connection that it is willing to provide a synchronization service.
4. Transit router 706 receives the synchronization offer from receiver 704 and forwards it on to receiver 710.
5. Receiver 710 directly contacts receiver 704 and synchronizes its database.

Apart from the redirection step, the synchronization connection establishment and information transfer between receiver 704 and receiver 710 remain the same as if they were directly connected.

The redirection by a transit router of downstream members requiring synchronization can become fairly inefficient in cases where the network is partitioned and then heals. This inefficiency can be eliminated by allowing the transit routers to actively participate in the synchronization process.

Figure 10:
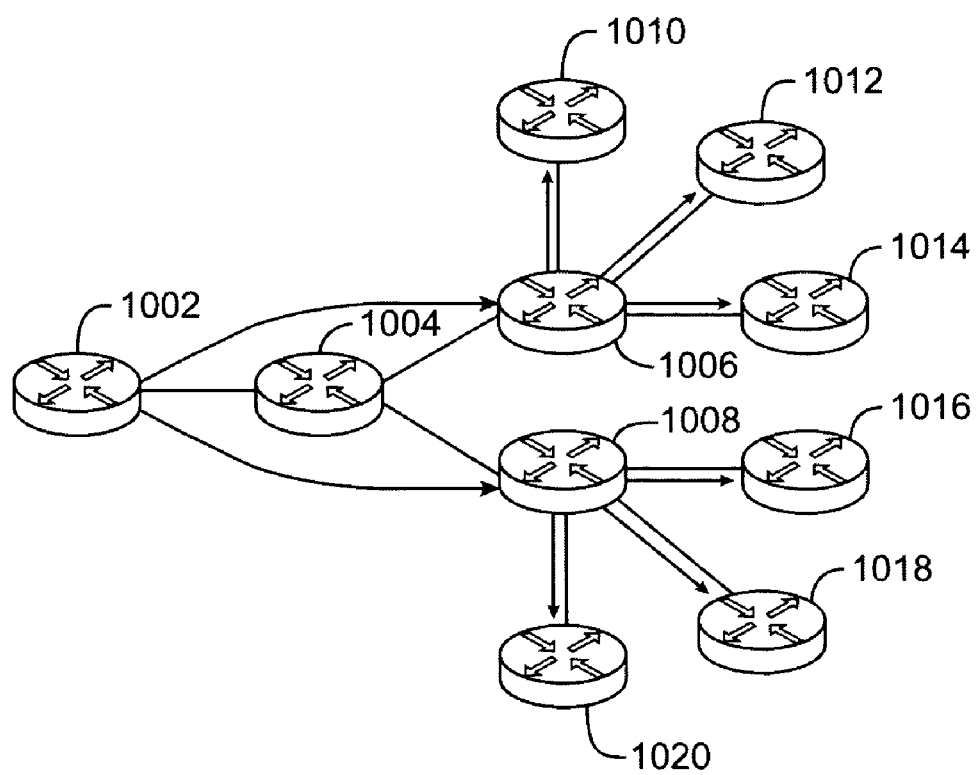
FIG. 10 depicts transit router participation in synchronization according to one embodiment of the present invention.

This scenario is illustrated with reference to FIG. 10. In FIG. 10, there is a source 1002, three transit routers 1004, 1006, and 1008 and six receivers 1010, 1012, 1014, 1016, 1018, and 1020. Consider for example the effects of a long duration failure of the link between source 1002 and transit router 1004. When connectivity is restored, if the link had been down for a sufficient amount of time then all six receivers will need to be synchronized. The normal behaviour of the transit routers 1004, 1006, and 1008 would be to redirect all the receivers to obtain the synchronization from upstream members. This would result in all recovering receivers synchronizing from source 1002. The drawbacks are:
1. Source router 1002 now originates six synchronization sessions. This requires significant processing and memory resources.
2. The links between source 1002 and the receivers will have to carry the synchronization data multiple times. In particular, network bandwidth on the link between source 1002 and transit router 1004 will be wasted since the same data will traverse six times.

A solution provided by embodiments of the present invention is to allow transit routers with multiple downstream synchronization requesters to actively forward the synchronization session. A transit router can forward a synchronization session by simply terminating a request from a number of downstream members and originating a request of its own upstream. When TCP connections for the synchronizations are established, the transit router merely copies data received in its upstream connection to all the downstream connections.

In the network of FIG. 10, transit routers 1006 and 1008 would each receive three synchronization requests from the downstream receivers. Instead of forwarding these requests upstream to transit router 1004, transit routers 1006 and 1008 can terminate the requests and originate a request of their own to transit router 1004. Since 1004 now only receives two synchronization requests (from transit routers 1006 and 1008) it can decide that it is not worth participating and simply forward them upstream to the source. Now source 1002 has only two downstream synchronization receivers and each of transit routers 1006 and 1008 have three synchronization receivers resulting in a much more scalable solution.

One consideration for the above scheme is that individual receiving routers needing synchronization are likely to stagger their requests over time. For example the request from receiver 1012 may arrive at transit router 1006 a fraction of a second later than the request from transit router 1010. One solution is to delay the propagation of synchronization requests through a transit router. However, in a network with multiple transit levels the delays would accumulate impacting recovery time.

A preferred solution is to allow a transit router that has previously forwarded a synchronization request upstream to interrupt the forwarded session and restart it through itself so that the restarted session can be shared. Before interrupting a forwarded session an inquiry into the status of the session is preferably made so that there is no interruption of sessions that have progressed past a predetermined point.

Network Device Details and Distributed Architecture

Figure 11A:
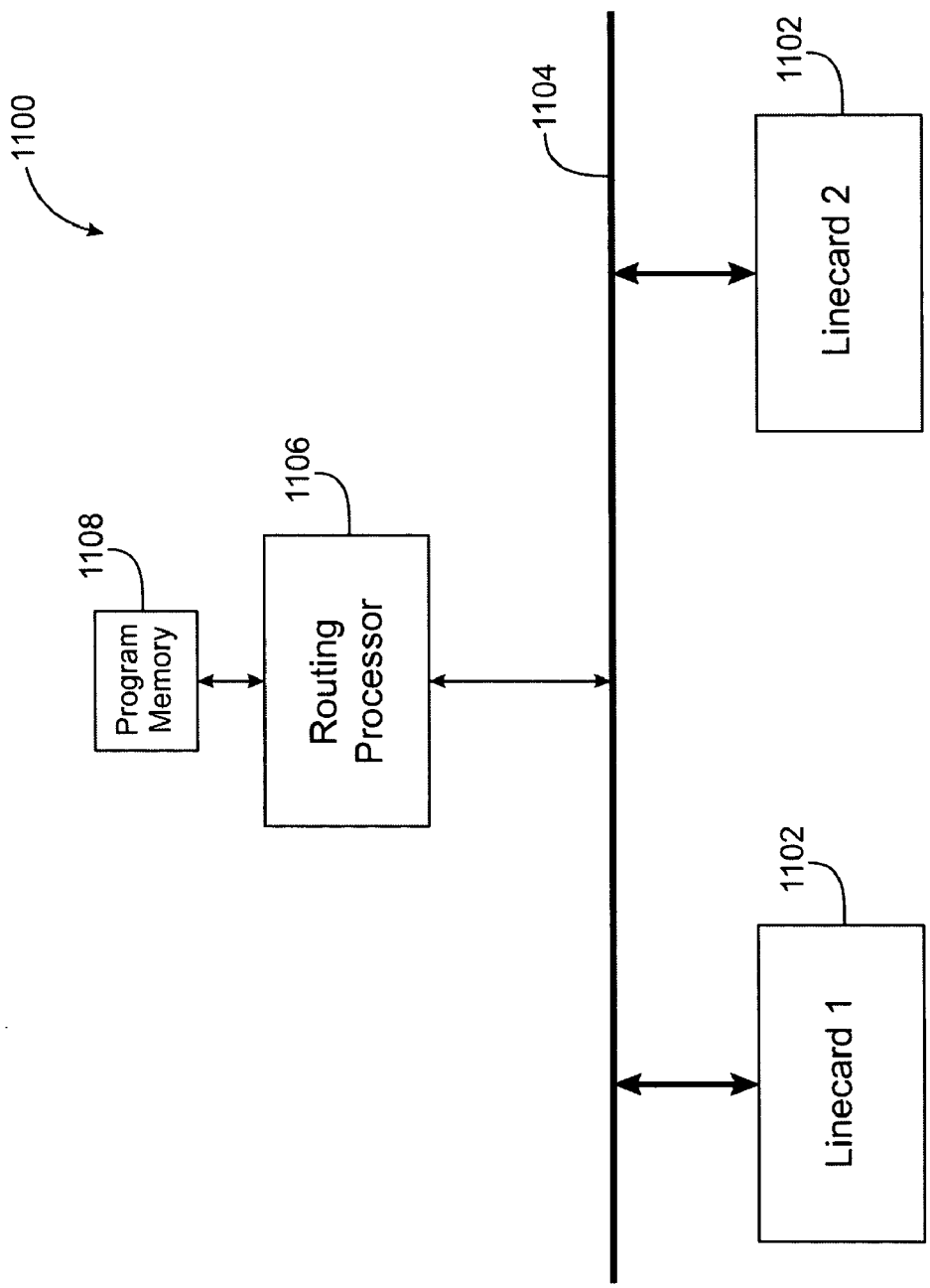
FIG. 11A depicts a network device according to one embodiment of the present invention.

FIG. 11A depicts a network device 1100 which may be used to implement the present invention. Linecards 1102 include network interfaces for coupling to physical media. Forwarding intelligence may also be found within linecards 1102. Only two linecards 1102 are depicted although it will be understood that there may actually be a very large number of linecards in the same network device 1100. Linecards 1102 are interconnected by a high-speed backplane 1104 for transferring of packets. A routing processor 1106 is responsible for control plane functionality. Routing processor 1106 has a relatively low-speed connection to high-speed backplane 1104.

Figure 11B:
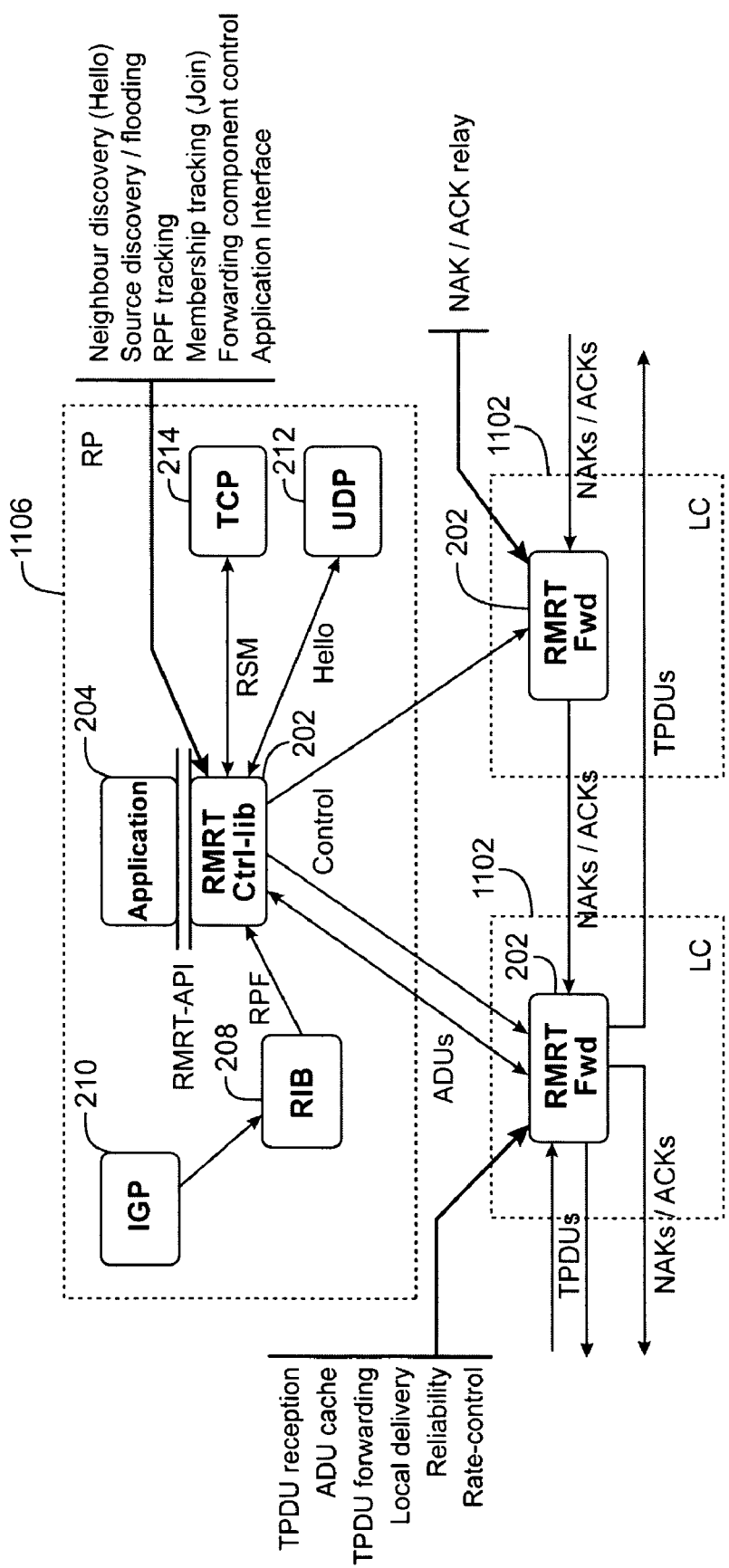
FIG. 11B depicts how functionality of the present invention may be divided between a routing processor and linecards.

Functionality of embodiments of the present invention may be divided between routing processor 1106 and linecards 1102 as shown in FIG. 11B. Generally speaking, in FIG. 11B the control components are implemented by routing processor 106 while caching and forwarding of ADUs are handled by linecards 1102 along with the acknowledgement mechanism. For example, routing processor 1106 may implement RPF neighbor tracking component 302, membership tracking component 304, the interface to application 204, and control of TPDU forwarding. Routing processor 1106 also implements the synchronization processes described above.

TPDU reception component 306, ADU cache 310, and TPDU propagation component 308 may be implemented on each of linecards 1102. The linecards 1102 are also responsible for retransmission. Each RMRT session is hosted on the linecard that serves as the interface to the upstream directly-connected neighbor. This linecard maintains the ADU cache 310 for the RMRT session. TPDUs to be propagated downstream are transferred to the linecards directly connected to the subscribing downstream neighbors. Similarly, positive and negative acknowledgements are received at the downstream-facing linecards and transferred to the linecard hosting the RMRT session to be either handled there or relayed to the upstream neighbor as appropriate. RMRT can thus be implemented within the context of a distributed forwarding architecture where packets are generally not handled directly by the routing processor but rather kept on the linecards for processing.

A portion of the functionality of routing processor 1106 may be implemented by software including instructions stored in a program memory 1108. Program memory 1108 is but one example of a computer-readable storage medium that can store software used when implementing embodiments of the present invention. Other examples include, e.g., hard drives, CD-ROMs, DVD-ROMs, flash memories, etc. Another example of a computer-readable storage medium is a signal that carries software across a network. Linecards 1102 may include their own processor functionality which may similarly be implemented in software.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for operating a selected node to distribute database updates within a network, said method comprising:
   generating a session announcement message including a session description and an identifier of the selected node as a source of a multi-party transport layer session for distributing database updates;
   receiving a join message identifying at least one directly-connected next-hop or previous-hop neighboring node, the join message comprising a request to participate in said transport layer session based on the session description;
   receiving an application data unit from an application operating at said selected node;
   assigning a sequence number to said application data unit, said sequence number configured for consistent use across all nodes participating in said transport session;
   encapsulating said application data unit within a transport protocol data unit;
   transmitting said transport protocol data unit to only said identified one or more directly-connected neighboring nodes as a part of said transport layer session; and
   retransmitting said application data unit to one of said directly-connected neighboring nodes if a request for retransmission is received from said directly-connected neighboring node;
   wherein said one or more directly-connected neighboring nodes are routers.

2. The method of claim 1 further comprising
   receiving prune messages from directly-connected neighboring nodes that no longer wish to participate in said transport layer session.

3. The method of claim 1 wherein said transport protocol data unit is propagated by said one or more identified neighboring nodes to other nodes.

4. The method of claim 1 wherein transmitting comprises utilizing an unreliable datagram protocol.

5. The method of claim 1 wherein said request for retransmission is a negative acknowledgement.

6. A method for operating a selected node to support a multi-party transport layer session, said method comprising:
   receiving a session announcement message including a session description and identifying a source node of the transport layer session;
   determining whether to participate in the transport layer session based on the session description;
   identifying a directly-connected node on a path toward the source node of the transport layer session, said directly-connected node being an upstream node on said path;

sending a join message to said upstream node to begin participating in said transport layer session;

receiving a transport protocol data unit from said upstream node;

extracting an application data unit from said transport protocol data unit and an associated sequence number received in the transport layer session, said associated sequence number previously assigned to said application data unit and configured for consistent use across all nodes participating in said transport layer session;

delivering said application data unit and said sequence number to an application operating at said selected node;

tracking said sequence numbers received in the transport layer session; and requesting retransmission of one or more of said application data units from said upstream node if one or more of said sequence numbers are missing;

wherein said directly-connected node is a router.

7. The method of claim 6 wherein identifying comprises:
based on a routing information base (RIB), determining a path from said selected node toward said transport layer session source.

8. The method of claim 6 further comprising:
identifying at least one directly-connected node other than said upstream node as a downstream node;
forwarding contents of said transport layer data unit to said downstream node.

9. The method of claim 8 wherein identifying comprises:
receiving a join message from said downstream node.

10. The method of claim 8 further comprising:
receiving a request for retransmission of said application data unit from said downstream node;
retrieving said application data unit from said application; and
retransmitting said application data unit to said downstream node.

11. The method of claim 8 further comprising:
receiving a request for retransmission of said application data unit from said downstream node;
forwarding said request to said upstream node;
receiving a retransmission of said application data unit from said upstream node; and
forwarding said retransmission to said downstream node.

12. The method of claim 6 further comprising:
receiving a join message from a downstream node, said downstream node being a directly-connected node other than said directly-connected node on said path toward said transport session source;
in response to said join message, retrieving all stored application data units of said transport session from said application; and
forwarding said retrieved application data units of said transport session to said downstream node.

13. A computer-readable storage medium encoded with a computer program for operating a selected node to distribute database updates within a network, said computer program comprising:

code that generates a session announcement message including a session description and an identifier of the selected node as a source of a multi-party transport layer session for distributing database updates;

code that receives a join message that identifies at least one directly-connected next-hop or previous-hop neighboring node, the join message comprising a request to participate in said transport layer session based on the session description;

code that receives an application data unit from an application operating at said selected node;

code that assigns a sequence number to said application data unit, said sequence number configured for consistent use across all nodes participating in said transport session;

code that encapsulates said application data unit within a transport protocol data unit;

code that transmits said transport protocol data unit to only said identified one or more directly-connected neighboring nodes as a part of said transport layer session; and code that retransmits said application data unit to one of said directly-connected neighboring nodes if a request for retransmission is received from said directly-connected neighboring node;

wherein said one or more directly-connected neighboring nodes are routers.

14. The computer-readable storage medium of claim 13 wherein said code that identifies comprises:

code that receives join messages from directly-connected neighboring nodes that wish to begin participating in said transport layer session; and code that receives prune messages from directly-connected neighboring nodes that no longer wish to participate in said transport layer session.

15. The computer-readable storage medium of claim 13 wherein said selected node is a source node for said transport layer session.

16. The computer-readable storage medium of claim 13 wherein said transport protocol data unit is propagated by said one or more identified neighboring nodes to other nodes.

17. A computer-readable storage medium encoded with a computer program for operating a selected node to support a multi-party transport layer session, said computer program comprising:

code that receives a session announcement message including a session description and identifying a source node of the transport layer session;

code that determines whether to participate in the transport layer session based on the session description;

code that identifies a directly-connected node on a path toward the source node of the transport layer session, said directly-connected node being an upstream node on said path;

code that sends a join message to said upstream node to begin participating in said transport layer session;

code that receives a transport protocol data unit from said upstream node;

code that extracts an application data unit from said transport protocol data unit and an associated sequence number received in the transport layer session, said associated sequence number previously assigned to said application data unit and configured for consistent use across all nodes participating in said transport layer session;

code that delivers said application data unit and said sequence number to an application operating at said selected node;

code that tracks said sequence numbers received in the transport layer session; and code that requests retransmission of one or more of said application data units from said upstream node if one or more of said sequence numbers are missing;

wherein said directly-connected node is a router.

18. The computer-readable storage medium of claim 17 wherein said code that identifies comprises:
    code that, based on a routing information base (RIB), determines a path from said selected node toward said transport layer session source.

19. The computer-readable storage medium of claim 17 further comprising:
    code that identifies at least one directly-connected node other than said upstream node as a downstream node; and
    code that forwards contents of said transport layer data unit to said downstream node.

20. The computer-readable storage medium of claim 19 wherein said code that identifies comprises:
    code that receives a join message from said downstream node.

21. The computer-readable storage medium of claim 19 further comprising:
    code that receives a request for retransmission of said application data unit from said downstream node;
    code that retrieves said application data unit from said application; and
    code that retransmits said application data unit to said downstream node.

22. The computer-readable storage medium of claim 19 further comprising:
    code that receives a request for retransmission of said application data unit from said downstream node;
    code that forwards said request to said upstream node;
    code that receives a retransmission of said application data unit from said upstream node; and
    code that forwards said retransmission to said downstream node.

23. The computer-readable storage medium of claim 17 further comprising:
    code that receives a join message from a downstream node, said downstream node being a directly-connected node other than said directly-connected node on said path toward said transport session source;
    code that, in response to said join message, retrieves all stored application data units of said transport session from said application; and
    code that forwards said retrieved application data units of said transport session to said downstream node.

24. Apparatus for operating a selected node to distribute database updates within a network, said apparatus comprising:
    means for generating a session announcement message including a session description and an identifier of the selected node as a source of a multi-party transport layer session for distributing database updates;
    means for receiving a join message identifying at least one directly-connected next-hop or previous-hop neighboring node, the join message comprising a request to participate in said transport layer session based on the session description;
    means for receiving an application data unit from an application operating at said selected node;
    means for assigning a sequence number to said application data unit, said sequence number configured for consistent use across all nodes participating in said transport session;
    means for encapsulating said application data unit within a transport protocol data unit;
    means for transmitting said transport protocol data unit to only said identified one or more directly-connected neighboring nodes as a part of said transport layer session; and
    retransmitting said application data unit to one of said directly-connected neighboring nodes if a request for retransmission is received from said directly-connected neighboring node;
    wherein said one or more directly-connected neighboring nodes are routers.

25. Apparatus for operating a selected node to support a multi-party transport layer session, said apparatus comprising:
    means for receiving a session announcement message including a session description and identifying a source node of the transport layer session;
    means for determining whether to join the transport layer session based on the session description;
    means for identifying a directly-connected node on a path toward the source node of the transport layer session, said directly-connected node being an upstream node on said path;
    means for sending a join message to said upstream node to begin participating in said transport layer session;
    means for receiving a transport protocol data unit from said upstream node;
    means for extracting an application data unit and an associated sequence number received in the transport layer session, from said transport protocol data unit, said associated sequence number previously assigned to said application data unit and configured for consistent use across all nodes participating in said transport layer session;
    means for delivering said application data unit and said sequence number to an application operating at said selected node;
    tracking said sequence numbers received in said transport layer session; and
    requesting retransmission of one or more of said application data units from said upstream node if one or more of said sequence numbers are missing;
    wherein said directly-connected node is a router.

26. Apparatus for operating a selected node to distribute database updates within a network, said apparatus comprising:
    a processor that executes instructions; and
    a memory device having said instructions stored thereon, said instructions comprising:
        code that generates a session announcement message including a session description and an identifier of the selected node as a source of a multi-party transport layer session for distributing database updates;
        code that receives a join message that identifies at least one directly-connected next-hop or previous-hop neighboring node, the join message comprising a request to participate in said transport layer session based on the session description;
        code that receives an application data unit from an application operating at said selected node;
        code that assigns a sequence number to said application data unit, said sequence number configured for consistent use across all nodes participating in said transport session;
        code that encapsulates said application data unit within a transport protocol data unit;

code that transmits said transport protocol data unit to only said identified one or more directly-connected neighboring nodes as a part of said transport layer session; and code that retransmits said application data unit to one of said directly-connected neighboring nodes if request for retransmission is received from said directly-connected neighboring node;

wherein said one or more directly-connected neighboring nodes are routers.

27. Apparatus for operating a selected node to support a multi-party transport layer session, said apparatus comprising:

a processor that executes instructions; and a memory device having said instructions stored thereon, said instructions comprising:

code that receives a session announcement message including a session description and identifying a source node of the transport layer session;

code that determines whether to participate in the transport layer session based on the session description;

code that identifies a directly-connected node on a path toward the source node of the transport layer session, said directly-connected node being an upstream node on said path;

code that sends a join message to said upstream node to begin participating in said transport layer session;

code that receives a transport protocol data unit from said upstream node;

code that extracts an application data unit from said transport protocol data unit and an associated sequence number received in the transport laver session, said associated sequence number previously assigned to said application data unit and configured for consistent use across all nodes participating in said transport layer session;

code that delivers said application data unit and said sequence number to an application operating at said selected node;

code that tracks said sequence numbers received in the transport layer session; and code that requests retransmission of one or more of said application data units from said upstream node if one or more of said sequence numbers are missing;

wherein said directly-connected node is a router.

* * * * *